United States Patent [19]

Wilke

[11] Patent Number: 4,597,410
[45] Date of Patent: Jul. 1, 1986

[54] CROSS LINE RELIEF VALVE MECHANISM
[75] Inventor: Raud A. Wilke, Brookfield, Wis.
[73] Assignee: Husco International, Waukesha, Wis.
[21] Appl. No.: 771,218
[22] Filed: Aug. 30, 1985
[51] Int. Cl.[4] .................................................. F16K 17/18
[52] U.S. Cl. ..................................... 137/491; 137/493;
137/493.9
[58] Field of Search ................. 91/436; 137/491, 493,
137/493.9

[56] References Cited
U.S. PATENT DOCUMENTS

| | | | |
|---|---|---|---|
| 3,194,261 | 7/1965 | Tennis | 137/493 X |
| 3,313,316 | 4/1967 | Thomas | 137/596 |
| 3,362,430 | 1/1968 | Olen | 137/491 X |
| 3,506,031 | 4/1970 | Stacey | 137/493 X |
| 4,476,890 | 10/1984 | Kawasaki | 137/493.9 X |

Primary Examiner—Robert G. Nilson
Attorney, Agent, or Firm—Andrus, Sceales, Starke & Sawall

[57] ABSTRACT

A cross line relief valve mechanism includes a pair of opposed relief valves contained in a bore connecting the service passages of a control valve. A high pressure condition in one of the service passages acts directly on the main poppet of one of the relief valves causing it to become unseated and communicating the high pressure condition to a zone in the bore between the two relief valves. The high pressure condition in this zone acts on the pilot poppet of the other relief valve causing it to open which results in the unseating of the main poppet in that relief valve. The high pressure condition in one of the service passages thus results in the opening of both valves so as to allow high pressure fluid to flow from one service passage to the other in order to obtain a balanced condition.

3 Claims, 2 Drawing Figures

CROSS LINE RELIEF VALVE MECHANISM

DESCRIPTION

1. Technical Field

This invention relates to cross line relief mechanisms for fluid pressure operated systems and more particularly to the relief of abnormally high and abnormally low pressure conditions in such systems.

2. Prior Art

Cross line relief mechanisms have been employed in hydraulic systems wherein a reversible hydraulic motor is connected with a load that tends to exert high inertia forces upon the motor, such as the laterally swinging boom of a large crane, the carriage of a power shovel, or the like. Such a motor is set in motion by shifting a control valve connected therewith to an operating position at which the valve directs pressure fluid from a source thereof to one side of the motor and at the same time permits return fluid from the other side of the motor to flow back to a reservoir. When the control valve is shifted back to its neutral or "hold" position, it cuts off the motor from both the pressure fluid source and the reservoir, in effect blocking the lines that connect the motor with the control valve. If the load driven by the motor has high inertia, it tends to keep the motor moving in the direction in which the motor had been driving the load, so that the motor tends to push return fluid into one of its lines connected with the control valve then to draw a void in the other line.

In the absence of some sort of relief mechanism the motor cannot move when its lines are thus blocked, and the pressure developed in the line into which the fluid is being urged by the inertia load could reach dangerously high magnitudes. A cross line relief mechanism prevents this unsafe condition by permitting fluid to bleed from one to the other of the service passages connected with the motor when the fluid pressure differences between the lines exceeds a predetermined high value.

In the past, patents such as U.S. Pat. No. 3,313,316 to Thomas, U.S. Pat. No. 3,362,430 to Olen and U.S. Pat. No. 3,506,031 to Stacey have utilized relief valve mechanisms mounted in a common bore. However, devices such as these have been objectionable due to the chattering and generally noisy, if not undependable, operational characteristics of the device.

Other cross line relief mechanisms such as that shown in U.S. Pat. No. 3,194,261 to Tennis utilize an attachment to the valve body which of course adds to the size and weight of the control valve.

The valve mechanisms of the Olen '430 patent are mounted in a bore which is at all times in communication with the exhaust passage in the control valve. This arrangement is objectionable for the reasons that when one relief valve opens in response to excessively high pressure (brought about by return of the valve spool to neutral) fluid flowing into the transfer passage from one end of the cylinder is allowed to return to the reservoir. All the high pressure fluid is thus *not* compelled to act upon the *other* relief valve for return to the other end of the motor, and a void can be drawn therein.

Also, the relief valves shown in these prior art patents rely upon the high pressure to first open their pilot poppets in order for the high pressure in the service passage to be communicated to the other side of the motor.

SUMMARY OF THE INVENTION

A cross line relief mechanism includes a body having a pair of service passages which provide pressurized fluid to a reversible fluid motor. The body has a bore which communicates only with the service passages.

In accordance with one aspect of the invention, a pair of main valves face each other in the bore, one for each service passage. The main valves normally block communication between the service passage and a zone of the bore between the main valves.

In accordance with yet another aspect of the invention, each of the main valves is provided with a chamber into which the main valve moves when its slides to its open position.

In accordance with yet another aspect of the invention, the main valve is provided with a peripheral surface on which the pressure fluid in the service passage can exert a force to effect its opening.

The relief mechanism is further provided with a pilot controlled passage which communicates the chamber of each valve mechanism with the associated service passage when its pilot poppet is opened by the pressure of the fluid admitted to the zone between the valves.

Finally, each main poppet is provided with means responsive to the fluid at high pressure admitted to the zone of the bore for effecting opening of that main poppet to accordingly allow fluid to flow from the zone of the bore to the service passage associated with that main poppet.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
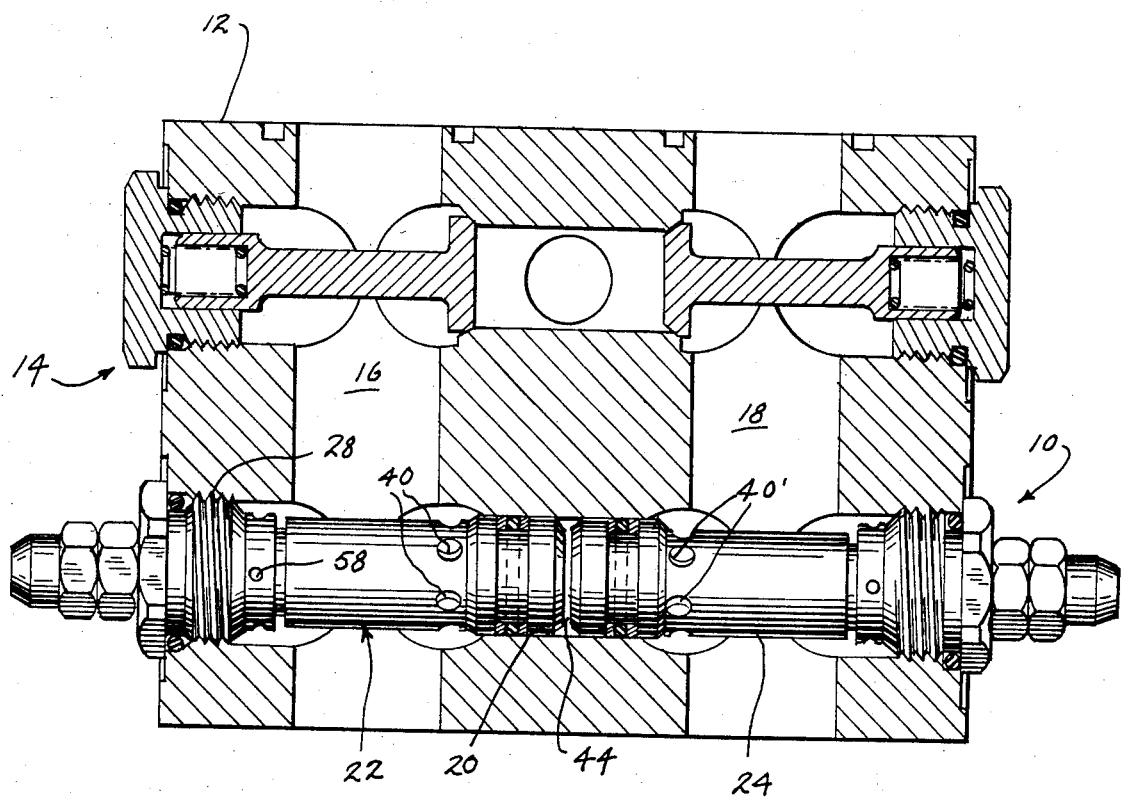
FIG. 1 is a side cross-sectional view of a control valve utilizing the cross line relief mechanism of the present invention.

As shown in FIG. 1, a cross line relief valve mechanism 10 is mounted in a housing 12 of a control valve 14 which provides pressurized fluid to a reversible fluid motor (not shown).

Housing 12 includes a pair of service passages 16 and 18 which provide the pressurized fluid to the service lines and a bore 20 which communicates service passage 16 with service passage 18.

A pair of opposed high pressure relief valves 22 and 24 are mounted in opposite end portions of bore 20. Since the operation of the relief valves is identical, only the operation of relief valve 22 and its associated service passage 16 will be described in detail.

Relief valve 22 has a casing 26 and body portion 32. The body portion 32 is shown as threaded into the hole 28 in housing 12. A main poppet mechanism 30 is slidably mounted in casing 26 and cooperates with valve body portion 32 to define a chamber 34 between main poppet 30 and body portion 32. Main poppet 30 has a shoulder portion 36 which engages valve seat 38 on casing 26 to thereby control communication between sidewall opening 40 and the end opening 42 of casing 26. End opening 42 communicates with a zone 44 of bore 20 located between the inner ends of relief valves 22 and 24 while sidewall opening 40 communicates with service passage 16.

Figure 2:
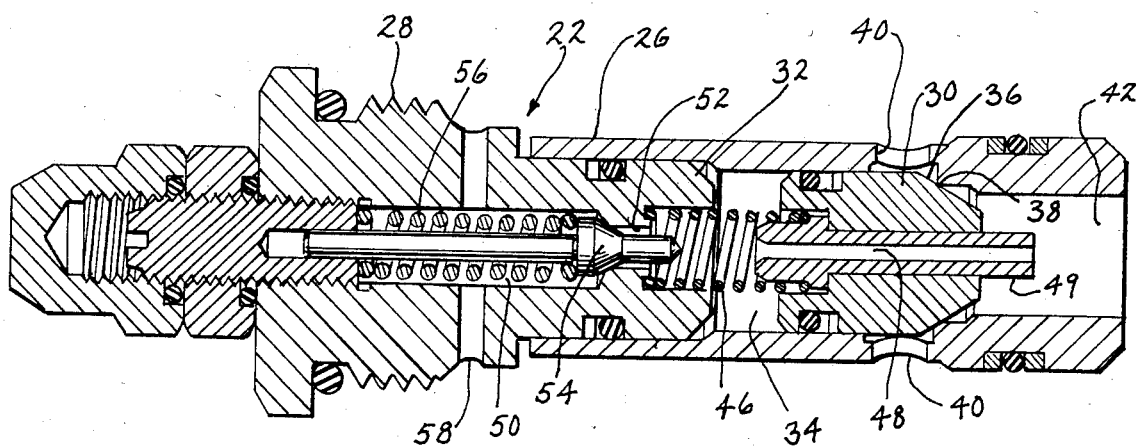
FIG. 2 is a side cross-sectional view of one of the relief valves utilized in the cross line relief mechanism of FIG. 1.

As seen in FIG. 2, shoulder portion 36 extends beyond valve seat 38 so as to provide a peripheral surface upon which the pressure fluid in service passage 16 can exert a force to effect its opening. Main poppet 30 is biased to a closed position by means of spring 46 and pressurized fluid in zone 44 is communicated to chamber 34 by means of end opening 42 and bore 48 in piston 49.

Chamber 34 also communicates with a rear chamber 50 via passageway 52 which is normally closed by means of pilot poppet 54. Pilot poppet 54 is biased to its closed position by means of spring 56. Chamber 50 in turn communicates with service passage 16 by means of holes 58.

For purposes of describing the operation, it will be assumed that the control valve has been shifted in such a manner as to cause a high pressure condition in service passage 18 and corresponding parts of relief valve 24 will be given corresponding numbers primed.

The high pressure fluid is communicated from service passage 18 through sidewall opening 40' and acts on shoulder portion 36'. Assuming the pressure is high enough to overcome the biasing force of spring 46', main poppet 30' will be unseated and high pressure fluid will be allowed to flow from service passage 18 through sidewall opening 40', through end opening 42' and into zone 44 of bore 20.

This high pressure fluid is then communicated to chamber 34 by means of end opening 42 and bore 48 in piston 49. The high pressure fluid will then act on pilot poppet 54, overcoming its spring 56 and causing pilot poppet 54 to become unseated and thus allow communication between chamber 34 and chamber 50 via bore 52. The unseating of pilot poppet 54 reduces the pressure in chamber 34 and allows the high pressure in zone 44 to overcome the biasing force of spring 46 and unseat main poppet 30. Any high pressure fluid in chamber 34 is allowed to flow into service passage 16 via holes 58 and high pressure fluid in zone 44 flows into service passage 16 via sidewall opening 40 and end opening 42.

Thus an abnormally high pressure situation in one of the service passages acts on a main poppet so as to allow the high pressure condition to be communicated to zone 44 in bore 20. The high pressure condition then immediately acts on the pilot valve in the other relief valve section causing it to open resulting in the opening of the main poppet in that valve section. Thus a high pressure condition results in the transfer of high pressure fluid to the other service passage and results in a balanced condition.

While the invention has been particularly shown and described with respect to a preferred embodiment thereof, it will be understood by those skilled in the art that the foregoing and other changes in form and details may be made therein without departing from the spirit and scope of the invention.

Having thus described my invention, what I claim as new, and desire to secure by Letters Patent is:

1. A cross line relief mechanism comprising:
   A. a body having a pair of service passages to provide portions of the service lines by which a reversible fluid motor is connectable with a control valve therefor, said body also having a bore which is communicable only with said service passages;
   B. a pair of main valves facing one another in the bore, one of each service passage and normally blocking communication between it and a zone of the bore between said main valves;
   C. means defining a pair of chambers, one for each main valve in which the latter is slidably received to move into its chamber upon opening thereof;
   D. means providing a peripheral surface on each main valve upon which pressure fluid in its associated service passage can exert force to effect opening thereof;
   E. means at all times communicating each chamber with said zone of the bore so as to allow fluid in said chamber to be displaced to said zone upon such opening of its associated main valve;
   F. passage means to communicate each of said chambers with its associated service passage;
   G. a pilot valve normally closing the passage leading to each service passage and adapted to be opened in consequence of the admittance of fluid to said zone of the bore from the other service passage upon opening of the main valve therefor;
   H. and a surface on each main valve exposed to said zone of the bore, upon which such fluid admitted to said zone can act to effect opening of the main valve under force exerted thereon by said fluid.

2. The cross line relief instrumentality defined in claim 1 further comprising:
   second passage means to communicate said service passage pressure fluid to said peripheral surface on said main valve with said second passage means communicating with said zone upon the opening of its associated main valve.

3. Cross line relief instrumentalities comprising:
   A. a body having a pair of service passages to provide portions of the service lines by which a reversible fluid motor is connectable with a control valve therefor, said body also having a bore communicable only with said service passages; and
   B. a pair of opposed valve mechanisms mounted in opposite end portions of the bore, one for each service passage and extending across the junction of the latter with the bore, each of said mechanisms having
      (1) normally closed main and pilot poppets,
      (2) a chamber between said poppets into which the main poppet is movable upon opening thereof, said chamber being in fluid transfer relation with a zone of the bore between said mechanisms,
      (3) means comprising a peripheral surface on the main poppet upon which fluid at an abnormally high pressure in its associated service passage can act to effect opening of the main poppet and consequent transfer of fluid from its chamber to said zone of the bore, along with flow of fluid from its associated service passage to said zone of the bore,
      (4) means providing a pilot controlled passage to communicate the chamber of each valve mechanism with the associated service passage at times when its pilot poppet is opened by pressure of fluid admitted to said zone of the bore from the service passage associated with the other of said valve mechanisms,
      (5) and means on each main poppet responsive to fluid at abnormally high pressure admitted to said zone of the bore upon opening of either main poppet by the force of fluid acting upon said peripheral surface thereof, for effecting opening of the other main poppet, to accordingly allow fluid to flow from said zone of the bore to the service passage associated with said other main poppet.

* * * * *